Feb. 7, 1961 L. E. BOWMAN ET AL 2,970,770
THERMOSTATIC MIXING VALVE
Original Filed July 17, 1953 2 Sheets-Sheet 2

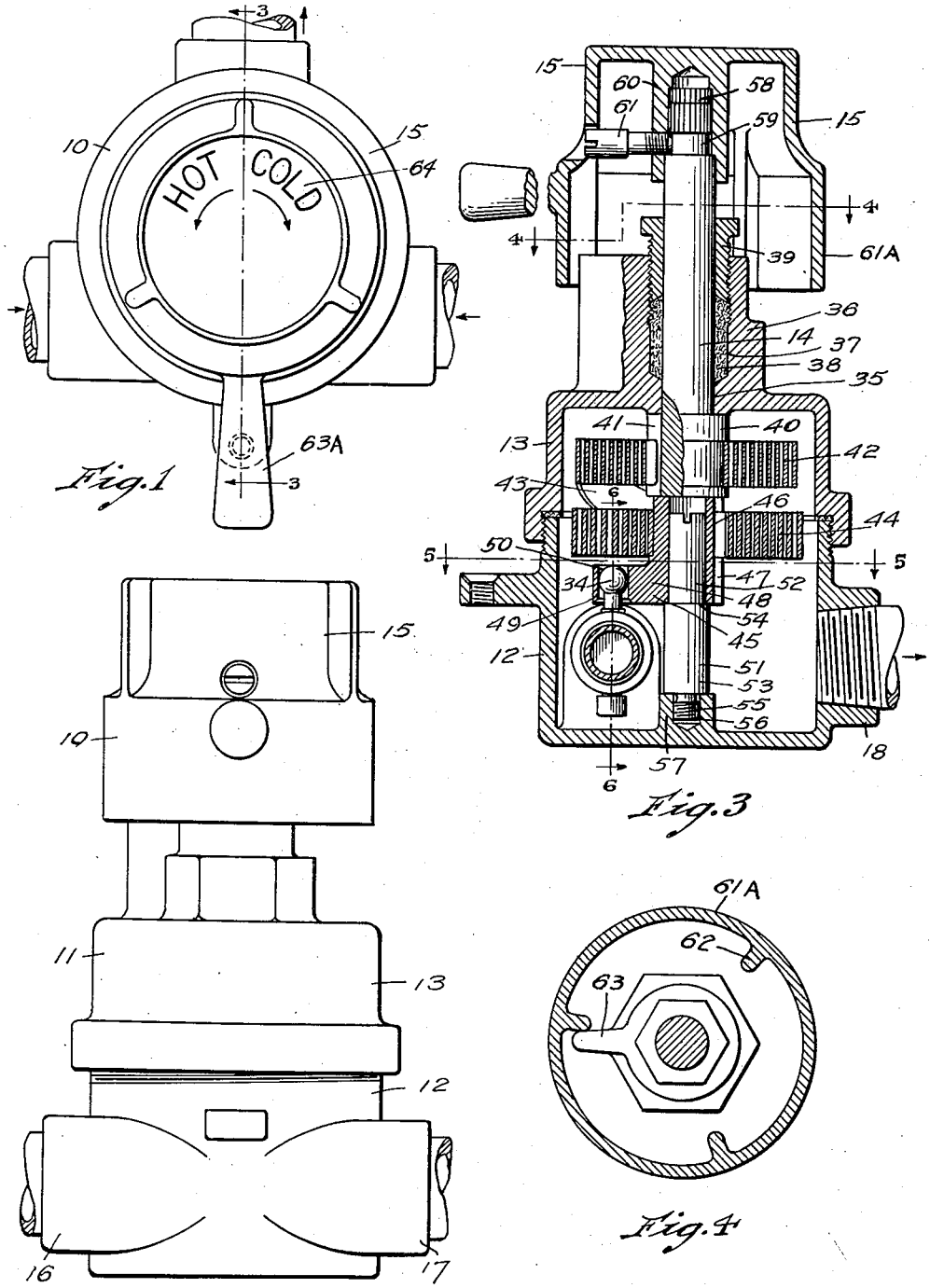

INVENTOR
Laurence E. Bowman
Frederick C. Cottage
By Nathaniel Frucht
ATTORNEY

United States Patent Office 2,970,770
Patented Feb. 7, 1961

2,970,770

THERMOSTATIC MIXING VALVE

Lawrence E. Bowman, Warwick, R.I., and Frederick C. Coppage, Melbourne, Fla., assignors to Leonard Valve Company, Cranston, R.I., a corporation of Rhode Island Continuation of application Ser. No. 368,635, July 17, 1953. This application Apr. 28, 1959, Ser. No. 809,574

4 Claims. (Cl. 236—12)

This application is a continuation of our application Serial No. 368,635, filed July 17, 1953 entitled Thermostatic Valve, now abandoned.

The present invention relates to thermostatic regulators and has particular reference to regulators for mixing fluids of different temperatures to obtain a fluid of predetermined temperature.

The principal object of the invention is to devise a thermostatic regulator of inexpensive construction, which is adapted to accurately control inflow of hot and cold fluids to a mixing chamber to provide an outflow of fluid of a desired temperature from the mixing chamber.

Another object of the invention is to provide a thermostatic regulator of rugged construction, which is readily assembled and which may be readily installed, repaired and reset.

With the above and other objects and advantageous features in view, the invention consists of a novel arrangement of parts more fully disclosed in the detailed description following, in conjunction with the accompanying drawings, and more specifically defined in the claims appended thereto.

In the drawings,

Figure 1 is a top plan view of an illustrative thermostatic valve embodying the invention.

Figure 2 is a side view thereof.

Figure 3 is a vertical section on the line 3—3 of Figure 1.

Figure 4 is a section on the line 4—4 of Figure 3, parts being omitted for clearness.

Figure 9:
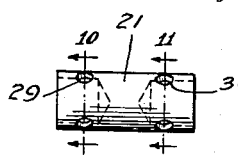
Figure 9 is a side view of the flow control valve seat.
Figure 10:
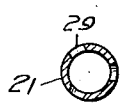
Figure 11:
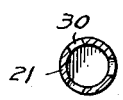

Figure 10 and 11 are sections of Figure 9 on the lines 10—10 and 11—11 respectively.

Figure 12:
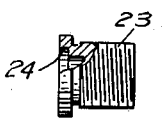

Figure 12 is a side view, partly broken away, of the separable valve seat suport bushing.

It has been found desirable to provide an inexpensive thermostatic valve which will accurately control inflowing volumes of hot and cold fluid to provide a mixed fluid of a definite temperature, the parts being of simple construction and readily assembled, whereby the manufacture is inexpensive and repairs and resetting are readily accomplished. To this end, we provide a housing for receiving hot and cold fluids, and a slide type control valve for regulating inflow of the hot and cold fluids to a mixing chamber, and we position a quick acting thermostatic coil unit in the mixing chamber to shift the control valve for maintaining a desired mixed fluid temperature, the parts being of very simple construction.

Referring to the drawings, the thermostatic regulator 10 includes a housing 11 having a base 12 and a cover 13, the housing including a valve stem 14 which extends outwardly from the cover and has a manually adjustable dial 15 mounted thereon for turning, as hereinafter described, to provide a fluid outflow of desired temperature.

The base 12, see Figure 3, is of cup shape, with laterally positioned threaded inlet sockets 16, 17 and a laterally positioned threaded outlet socket 18. The base has an inwardly extending boss 19 aligned with the inlet socket 16, the boss 19 having a longitudinal bore 20 and being recessed at its inner edge as indicated at 20a to receive one end of cylindrical valve seat 21. The housing has a threaded opening 22 in line with the other inlet socket 17 to receive a bushing 23, see Figure 12, the inner end of the bushing being recessed as indicated by the reference numeral 24 to receive the other end of the valve seat 21, which is therefore readily mounted after the central valve is set thereon by first threading the bushing into the opening 22 to allow positioning one end of the valve seat into the recess 20a, whereupon the bushing is backed out to lock the other end of the valve seat into the bushing recess 24; a lock nut 25 then locks the bushing in place.

Figure 5:
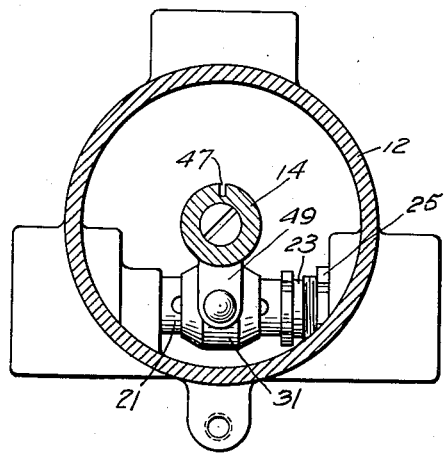
Figure 5 is a section on the line 5—5 of Figure 3.
Figure 7:
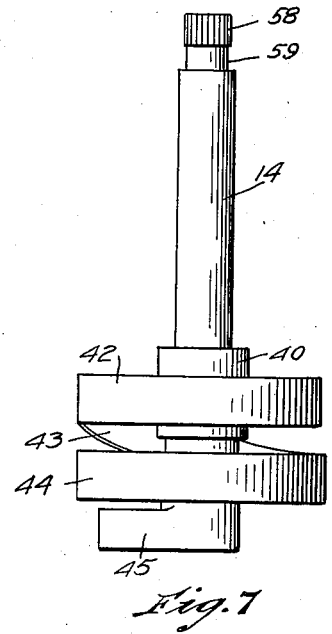
Figure 7 is an elevation of the valve stem and its associated thermostatic coil.
Figure 6:
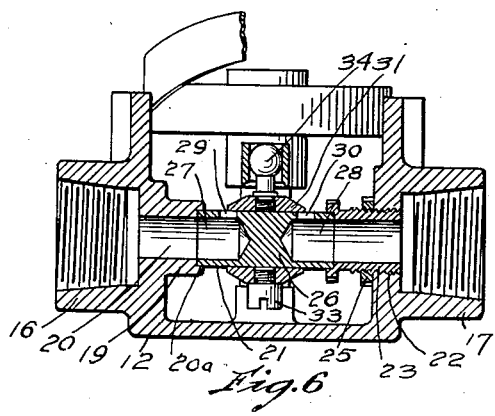
Figure 6 is a section on the line 6—6 of Figure 3.
Figure 8:
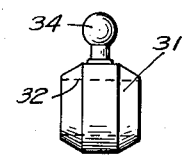
Figure 8 is a plan view of the flow control valve.

The valve seat 21 has a central partition 26, see Figure 6, and is recessed at each end to provide fluid passageways 27, 28 which respectively communicate with the inlet socket 16 through the bore of the boss 19 and with the inlet socket 17 through the bushing 23, the passageways 27 and 28 being respectively provided with sets of flow ports 29, 30 in the walls of the valve seat, preferably three in number as illustrated in Figures 10 and 11. This valve seat should be positioned with one set of flow ports at right angles to the thermo-static coil thus allowing a stream of hot and cold fluid to directly strike the thermostat while the fluid from the other two sets of flow ports are in the process of being mixed or partially mixed before flowing to the outlet and contacting the thermostat during the flow. This feature not only results in maintaining control under violent pressure changes in either the hot or cold supplies but also results in maintaining accurate control at any predetermined setting within the range of the hot and cold supply temperatures. A control valve 31 has a cylindrical bore 32 and is slidably and rotatably mounted on the valve seat 21, the outer ends of the valve 31 being conically tapered as illustrated; a screw 33 is threaded into the lower end of the valve 31, and a ball joint pin 34 is threaded into the upper end of the valve 31, the screw being a weight part which keeps the ball joint pin upwardly and thus facilitates assembly as hereinafter described. As the valve 31 shifts on the valve seat, the flow area of one set of ports is decreased and the flow area of the other set of ports increases.

The valve stem 14 is rotatably mounted in a bore 35 in the cover 13, see Figure 3, the cover being provided with a vertical upper extension 36 recessed as indicated at 37 to receive valve stem packing 38, and having its inner upper end threaded to receive a threaded packing gland 39. The lower end of the valve stem has an enlarged drum portion 40 with a vertical slot 41 in which one end of a thermostatic coil section 42 is seated, the coil strip 43 being spirally wound outwardly and then extending down and being spirally wound inwardly to provide a second coil section 44. A tubular connector member 45 has an upper cylindrical portion 46 with a vertical slit 47 in which the free end of the thermostatic coil section is received, and an enlarged lower portion 48 which has a lateral foot 49 provided with circular socket opening or recess 50 adapted to receive the valve ball joint pin 34, the connector member seating on a cylindrical bearing stud 51 which has a reduced upper end 52 extending into the tubular connector member and an enlarged lower end 53 which provides an annular shoulder 54 for the connecting member, the enlarged lower end 53 having a threaded extension 55 for threading into the socket 56 of a vertical supporting boss 57 integral with the lower floor of the base 12.

Referring now to Figures 2 and 3, the upper end of the valve stem is vertically splined as indicated by the reference numeral 58, and an annular channel 59 is provided; the dial 15 includes a depending shell 60 which is internally vertically splined to adjustably key on the knurled upper end of the valve stem, a lock screw 61 being passed through the shell 60 to extend into the annular channel 59 to lock the parts together.

The dial 15 also has a depending flared skirt 61A which has three inwardly extending vertical ribs 62 spaced approximately 120 degrees apart, for cooperation with a vertical upstanding rib 63 on the cover, the ribs 62 forming stops for rotative setting movement of the dial, which preferably has a manually movable arm 63A for this purpose, and also indicia 64 indicating the direction of movement for obtaining a desired fluid temperature.

The operation of the novel thermostatic regulator may now be explained. The parts being assembled as shown in Figures 2, 3, 5 and 6. Valve stem 14 seats on connection member 45, which in turn is rotatably mounted on the reduced upper end of bearing stud 51. The upper end of the double thermostatic coil 42 is fixed in slot 41, in the valve stem 14, and the lower end of thermostatic coil 44 is fixed in slit 47 in connection member 45. Connection member 45 has a foot 49 provided with a circular socket opening or recess 50 in which ball 34 seats. Expansion or contraction of double thermostatic coil 42, 44, causes foot 49 to swing or pivot in a narrow arc, thereby sliding control valve 31 in two directions; lineally and circumferentially to impart a helical sliding movement to the control valve 31 on cylindrical valve seat 21. This helical movement provides a very accurate cut-off through the flow ports 29, 30 in an action which wipes valve seat 21 clean of sediment. The two sets of flow ports, three in number for each set, direct one hot flow port 29 and one cold flow port 30 toward thermostatic coil 44. The other flow ports in the two sets provide a mixed fluid in the chamber of base 12. It will be noted that connecting member 45 is mounted for independent rotation on reduced upper end 52 through upper cylindrical portion 46. Projecting foot 49 is provided with substantially cylindrical socket opening 50 of a size to closely engage ball joint pin 34 entirely about a great circle in a pivotal connection. The great circle lies in a plane that is substantially at right angles to a plane passing through the longitudinal axis of the ball joint pin 34 and the longitudinal axis of the valve seat 21. Rotation of the connecting member 45 passes the socket opening 50 through an arc of rotation to move said ball joint pin 34 both linearly and circumferentially to impart the helical motion.

The regulator is checked for normal use by setting the valve stem to provide a normal mixing of hot and cold fluids. The dial is now set and locked in place. Any variation in the temperature of the mixed fluid causes a reaction of the thermostatic coil to shift the control valve and thus change the proportions of hot and cold fluid inflow to the normal setting; a shift of the dial to the left or right changes the position of the thermostatic valve and the control valve to establish a different temperature setting.

All the parts are readily manufactured and assembled, and the adjustment is simple, whereby repairs may be made and the regulator may be cleaned by a plumber without necessity for sending the regulator back to the manufacturer.

Although we have described a specific embodiment of the invention, it is obvious that changes in the size, shape, and arrangement of the parts may be made for different flow and temperature requirements, without departing from the spirit or the scope of the claims as appended hereto.

What we claim is:

1. In a thermostatic regulator, a housing having a mixing chamber, two laterally positioned inlets and an outlet, a cylindrical valve seat, having a central partition and two oppositely disposed flow passageways, secured on opposite ends in said two laterally positioned inlets, a set of aligned circumferentially spaced flow ports for each passageway for conducting hot and cold fluids from said two laterally positioned inlets to said mixing chamber, a control valve slidably mounted on said cylindrical valve seat and movable to increase flow through one set of flow ports and to simultaneously decrease flow through the other set of flow ports, said control valve having a ball joint pin fixed thereto and extending radially outward therefrom, a valve stem rotatably mounted in said housing, a cylindrical bearing stud fixed in said housing, a connecting member comprising an upper cylindrical portion rotatably mounted for independent rotation on said cylindrical bearing stud, a lateral foot projecting from said cylindrical portion having a substantially cylindrical socket opening of a size to closely engage said ball joint pin entirely about a great circle thereof in a pivotal connection, said great circle lying in a plane that is substantially at right angles to a plane passing through the longitudinal axis of the ball joint pin and the longitudinal axis of the valve seat, whereby rotation of said connecting member passes said socket opening through an arc of rotation to move said ball joint pin both linearly and circumferentially to impart a helical sliding movement to the control valve on the cylindrical valve seat, and a thermostatic coil in the mixing chamber having one end connected to the valve stem and the other end connected to the connection member whereby expansion or contraction of the thermostatic coil imparts rotation to said connecting member.

2. In a thermostatic regulator, a housing having a mixing chamber, two laterally positioned inlets and an outlet, a cylindrical valve seat, having a central partition and two oppositely disposed flow passageways, secured on opposite ends in said two laterally positioned inlets, a set of aligned circumferentially spaced flow ports for each passageway for conducting hot and cold fluids from said two laterally positioned inlets to said mixing chamber, a control valve slidably mounted on said cylindrical valve seat and movable to increase flow through one set of flow ports and to simultaneously decrease flow through the other set of flow ports, said control valve having a ball joint pin fixed thereto and extending radially outward therefrom and a weighted portion oppositely disposed with respect to said ball joint pin to counterbalance the weight of said ball joint pin, a valve stem rotatably mounted in said housing, a cylindrical bearing stud fixed in said housing, a connecting member comprising an upper cylindrical portion rotatably mounted for independent rotation on said cylindrical bearing stud, a lateral foot projecting from said cylindrical portion having a substantially cylindrical socket opening of a size to closely engage said ball joint pin entirely about a great circle thereof in a pivotal connection, said great circle lying in a plane that is substantially at right angles to a plane passing through the longitudinal axis of the ball joint pin and the longitudinal axis of the valve seat, whereby rotation of said connecting member passes said socket opening through an arc of rotation to move said ball joint pin both linearly and circumferentially to impart a helical sliding movement to the control valve on the cylindrical valve seat, and a thermostatic coil in the mixing chamber having one end connected to the valve stem and the other end connected to the connection member whereby expansion or contraction of the thermostatic coil imparts rotation to said connecting member.

3. In a thermostatic regulator, a housing having a mixing chamber, two laterally positioned inlets and an outlet, a cylindrical valve seat, having a central partition and two oppositely disposed flow passageways, secured on opposite ends in said two laterally positioned inlets, a set of aligned circumferentially spaced flow ports for each passageway for conducting hot and cold fluids from said two laterally positioned inlets to said mixing chamber, a control valve slidably mounted on said cylindrical valve seat and movable to increase flow through one set of flow ports and to simultaneously decrease flow through the other set of flow ports, said control valve having a ball joint pin fixed thereto and extending radially outward therefrom, a valve stem rotatably mounted in said housing, a cylindrical bearing stud fixed in said housing, a connecting member comprising an upper cylindrical portion rotatably mounted for independent rotation on said cylindrical bearing stud, a lateral foot projecting from said cylindrical portion having a substantialy cylindrical socket opening of a size to closely engage said ball joint pin entirely about a great circle thereof in a pivotal connection, said great circle lying in a plane that is substantially at right angles to a plane passing through the longitudinal axis of the ball joint pin and the longitudinal axis of the valve seat, whereby rotation of said connecting member passes said socket opening through an arc of rotation to move said ball joint pin both linearly and circumferentially to impart a helical sliding movement to the control valve on the cylindrical valve seat, and a thermostatic coil in the mixing chamber having one end connected to the valve stem and the other end connected to the connection member whereby expansion or contraction of the thermostatic coil imparts rotation to said connecting member, and one flow port of each set of said aligned circumferentially spaced flow ports facing towards the thermostatic coil for directing the flow through said mixing chamber and directly towards said thermostatic coil to stabilize the reaction of the thermostatic coil.

4. A thermostatic regulator for mixing and controlling the flow of hot and cold water, a housing having a cup shaped base provided with laterally positioned inlet sockets for hot and cold water and a laterally positioned outlet socket, said cup shape forming a fluid mixing chamber, an inwardly extending boss aligned with one of said inlet sockets and provided with a longitudinal bore having a recessed inner edge, a cylindrical valve seat having a central partition and two oppositely disposed flow passageways, a set of three circumferentially spaced flow ports for each passageway, a threaded opening in the other socket, a bushing, having a recessed inner edge, rotatably mounted in the threaded opening of the other inlet socket, the opposite ends of said cylindrical valve seat engaging, respectively the recessed inner edge of said longitudinal bore and the recessed inner edge of said bushing to secure said cylindrical valve seat in said mixing chamber through the rotation of said bushing, and for conducting hot and cold water from said two laterally positioned inlets to said mixing chamber, a control valve slidably mounted upon said cylindrical valve seat and movable to increase flow through one set of flow ports and to simultaneously decrease flow through the other set of flow ports, said control valve having a ball joint pin fixed thereto and extending radially outward therefrom and a weighted portion oppositely disposed with respect to said ball joint pin and fixed to said control valve to counterbalance the weight of said ball joint pin, a cylindrical bearing stud secured in said base and projecting vertically into said mixing chamber, a valve stem rotatably mounted in said housing, in vertical alignment with said cylindrical bearing stud, a connecting member comprising an upper cylindrical portion rotatably mounted for independent rotation upon said cylindrical bearing stud, and a lateral foot projecting from said cylindrical portion having a substantially cylindrical socket opening of a size to closely engage said ball joint pin entirely about a great circle thereof in a pivotal connection, said great circle lying in a plane that is substantially at right angles to a plane passing through the longitudinal axis of the ball joint pin and the longitudinal axis of the valve seat, whereby rotation of said connecting member passes said socket opening through a horizontal arc of rotation to move said ball joint pin both linearly and circumferentially to impart a helical sliding motion to the control valve upon the cylindrical valve seat, and a thermostatic coil in the mixing chamber having one end connected to the valve stem and the other end connected to the connection member whereby expansion or contraction of the thermostatic coil imparts rotation to said connecting member, and one flow port of each set of said aligned circumferentially spaced flow ports facing towards the thermostatic coil for directing the flow through said mixing chamber and directly towards said thermostatic coil to stabilize the reaction of the thermostatic coil.

References Cited in the file of this patent

UNITED STATES PATENTS

| | | |
|---|---|---|
| 2,015,267 | Granberg | Sept. 24, 1935 |
| 2,669,094 | Lee | Feb. 16, 1954 |

FOREIGN PATENTS

| | | |
|---|---|---|
| 545,555 | Great Britain | June 2, 1942 |
| 649,447 | Great Britain | Jan. 24, 1951 |